Jan. 11, 1944.     L. B. STRATTON     2,338,980
BABY SPOON
Filed April 10, 1942
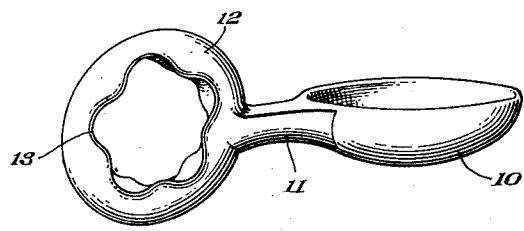
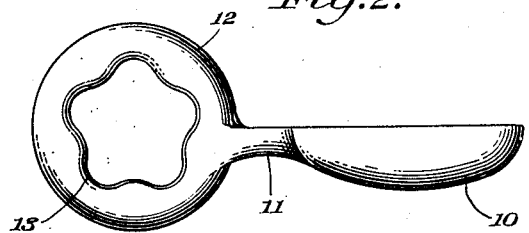
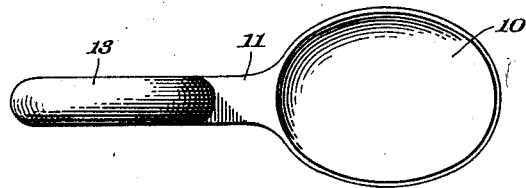
Leslie B. Stratton
INVENTOR.
BY
Victor J. Evans & Co.
ATTORNEYS Patented Jan. 11, 1944

2,338,980

UNITED STATES PATENT OFFICE 2,338,980

BABY SPOON

Leslie Buford Stratton, Quincy, Calif.

Application April 10, 1942, Serial No. 438,501

1 Claim. (Cl. 30—324)

This invention relates to a baby spoon and has for an object to provide a device of this character which will include a ring disposed in a plane at a right angle to the plane of the bowl of the spoon, and formed with four or more curved recesses forming finger grips whereby the spoon may be held in a variety of angular positions in use.

A further object is to provide a device of this character which will be formed of a single, strong and durable part, which will be inexpensive to manufacture and which will not easily get out of order.

With the above and other objects in view the invention consists of certain novel details of construction and combinations of parts hereinafter fully described and claimed, it being understood that various modifications may be resorted to within the scope of the appended claim without departing from the spirit or sacrificing any of the advantages of the invention.

In the accompanying drawing forming a part of this specification:

Figure 1 is a perspective view of a baby spoon constructed in accordance with the invention.

Figure 2 is a side elevation of the baby spoon.

Figure 3 is a top plan view of the baby spoon.

Referring now to the drawing in which like characters of reference designate similar parts in the various views, the baby spoon comprising bowl 10, having a shank 11, and a handle 12. The shank 11 is comparatively short. The handle 12 is in the form of a ring and is disposed in a plane at a right angle to the plane of the bowl and provided on the inner periphery with four or more curved recesses 13. The handle 12 extends above and below the shank 11. The handle 12 is provided in its upper side with one and in its lower side with two of the recesses 13. The remaining recesses 13 are located in the front and rear sides of the handle. The upper recess 13 is located in the vertical center of the handle, and the lower recesses are located respectively at opposite sides of said center. The front and rear recesses 13 are located above the shank. As the shank 11 is short, as the handle 12 is located at right angles to the bowl and extends above and below the shank, and due to the arrangement of the recesses 13 within the handle, the spoon may be held without consciousness in any desired or required angular position with relation to the hand with little or no danger of the spoon's accidentally moving downwardly from its position in the hand.

The above described spoon may be formed of rubber, or suitable plastic as an alternative, and when the spoon is not in use as a spoon, the device may be used as a teething ring for infants of suitable age since the ring 12 may be conveniently inserted in the infant's mouth when the infant holds the bowl or the handle in one hand.

The bowl 10 is relatively deep and is substantially oval in contour so that the contents will not be easily spilled.

From the above description it is thought that the invention will be fully understood without further explanation.

What is claimed is:

A spoon of the character set forth comprising a bowl, a short shank, and a handle of annular formation arranged at right angles to the bowl and extending above and below the shank, the handle being provided in its inner periphery with an upper recess, lower recesses and front and rear recesses forming finger grips, the upper recess being located in the vertical center of the handle and the lower recesses being located respectively at opposite sides of said center, and the front and rear recesses being located above the shank.

LESLIE BUFORD STRATTON.